United States Patent [19]
Jackson

[11] 3,716,977
[45] Feb. 20, 1973

[54] GRASS CATCHER ASSEMBLY

[75] Inventor: Harold P. Jackson, McDonough, Ga.

[73] Assignee: McDonough Power Equipment, Inc., McDonough, Ga.

[22] Filed: Nov. 8, 1971

[21] Appl. No.: 196,583

[52] U.S. Cl................................56/202, 15/83
[51] Int. Cl..............................A01d 35/22
[58] Field of Search............56/16.6, 194, 202, 203; 150/51; 220/18; 15/79, 83; 232/43.2; 248/97–101; 141/10, 114, 313–316

[56] References Cited

UNITED STATES PATENTS

| | | | |
|---|---|---|---|
| 1,180,225 | 4/1916 | Bamman et al | 248/99 |
| 3,201,072 | 8/1965 | Du Bois | 248/99 |
| 3,529,766 | 9/1970 | Mott, Sr. et al | 248/99 X |
| 1,731,341 | 10/1929 | Lantz | 248/99 X |
| 623,642 | 4/1899 | Wallen, Sr | 232/43.2 |
| 3,199,277 | 8/1965 | Moody | 56/16.6 |

*Primary Examiner*—Louis G. Mancene
*Assistant Examiner*—J. A. Oliff
*Attorney*—Francis C. Browne et al.

[57] ABSTRACT

A grass catcher assembly for a lawn mower including a rectangular main frame adapted to be supported at the rear of a lawn mower in a horizontal plane, a rectangular subframe having a bag suspended therefrom with the subframe slidably mounted for movement in a horizontal plane relative to said main frame. Closing the top of the bag is a cover releasably secured on the main frame and having an inlet opening for receiving a chute extending from the blade housing of the mower to deliver grass clippings into the bag through the cover. The inlet opening is located to one side of the cover and defined by a raised portion on the cover which also defines a passage for guiding the grass clippings in the longitudinal direction of the bag to ensure uniform distribution of the grass clippings across the bag. The subframe with the bag depending therefrom is releasably retained in the main frame for use by means of a pivoted stop which may be moved to release the subframe and permit it together with the bag to be slid in a horizontal plane out of the main frame for discharging the contents of the bag.

27 Claims, 8 Drawing Figures

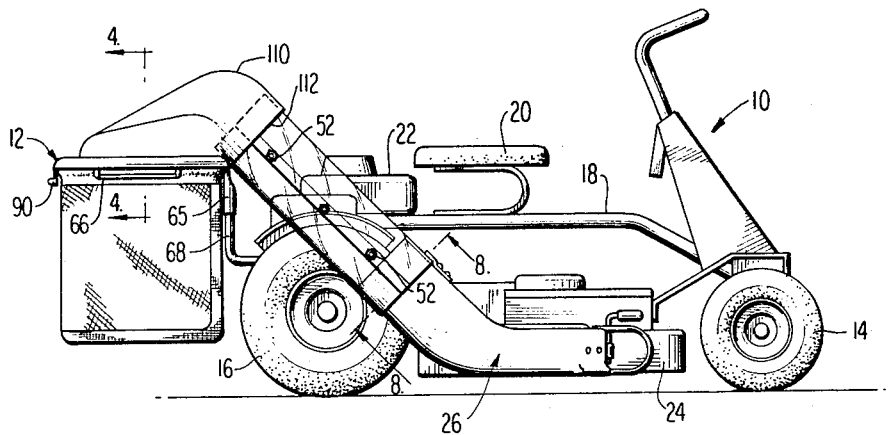
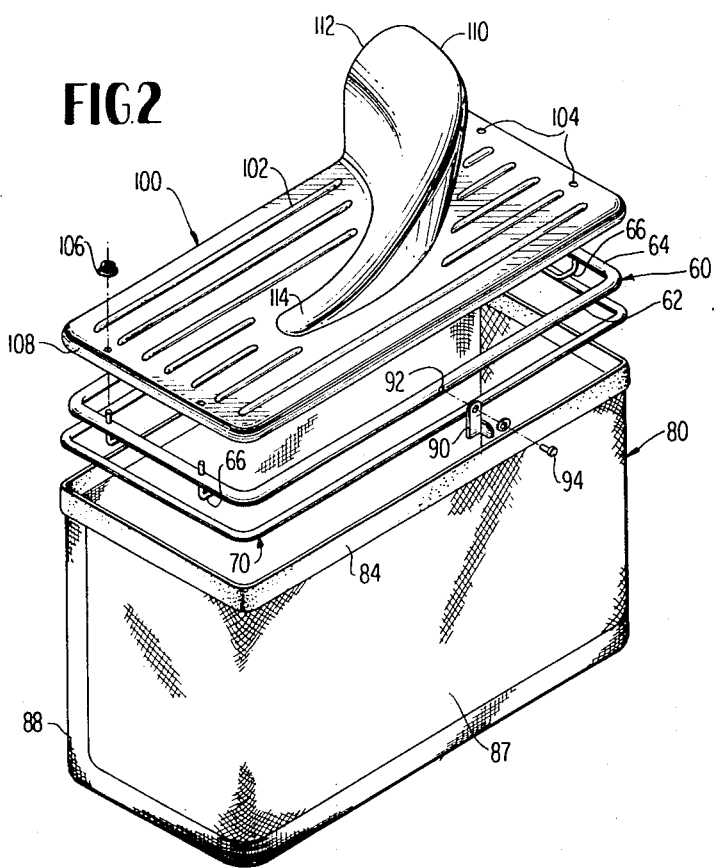
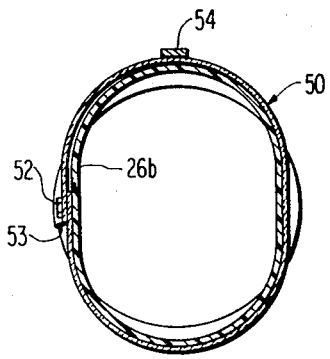

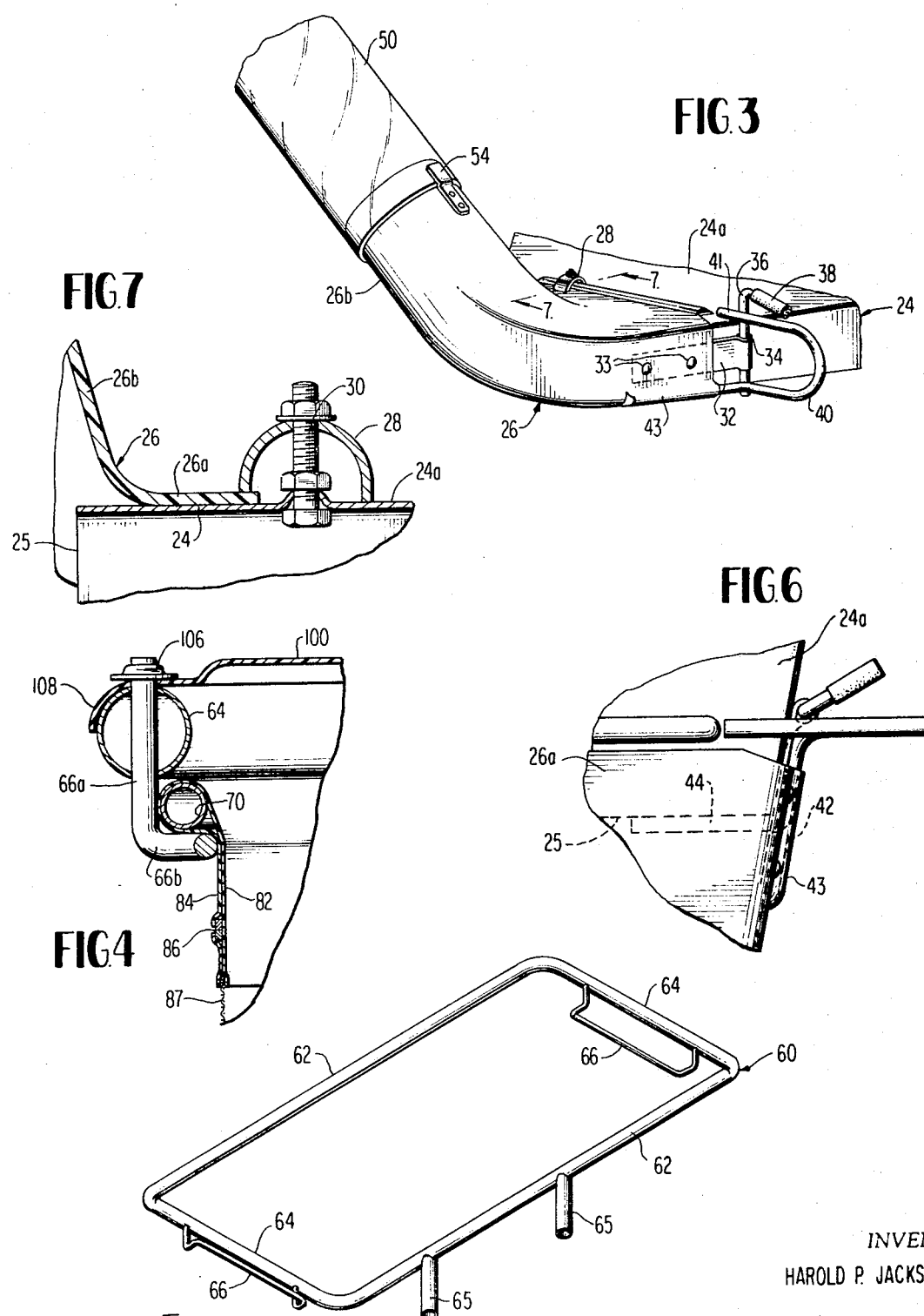

GRASS CATCHER ASSEMBLY

OBJECTS OF INVENTION

The present invention relates to a novel grass catcher assembly particularly suitable for use on riding-type lawn mowers such as, for example, the Snapper Comet riding mower manufactured by McDonough Power Equipment, Inc., the assignee of the present application.

One of the objects of the present invention is to provide a new grass catcher assembly which may be easily mounted to an associated lawn mower or similar device and will provide rapid, high volume grass collection. Included herein is a provision of such a grass catcher assembly including a grass collecting bag which may be easily removed and discharged of its contents and subsequently repositioned in the assembly for repeated use.

A further object of the present invention is to provide such a grass catcher assembly including a grass collector bag which is evenly filled during a grass mowing operation from the bottom to the top of the bag to ensure maximum efficiency.

A further object of the present invention is to provide such a grass catcher assembly which may be made from standard materials to possess a durable construction which may be adapted to conventional and other types of lawn mowers to provide dependable grass collection over long periods of repeated and rugged use.

SUMMARY OF INVENTION

The above and other objects are achieved in a grass catcher assembly including a rectangular main frame having means for securing it in a horizontal plane to the rear of an associated lawn mower. Opposite end portions of the main frame have depending rigid straps for slidably receiving and supporting relative to the main frame, a rectangular subframe defining an opening below which is suspended a grass receiving bag; the top edge portion of the bag being secured on the subframe by means of a zipper mechanism. The subframe together with its bag is movable in a horizontal plane along the straps relative to the main frame between a use position below the main frame and a discharge position horizontally displaced from the main frame for purposes of emptying the contents of the bag. A stop member pivoted to the main frame serves to releasably secure the subframe in the operative position against movement relative to the main frame. The stop may be pivoted to a release position allowing the subframe to be slid out from the main frame for discharging the contents of the bag.

Closing the top open end of the bag when in the use position, is a cover releasably secured to the main frame. Grass clippings are introduced into the bag through an opening in the cover offset towards one side thereof for receiving a chute connected to the blade housing of the associated mower to convey grass clippings from the blade housing into the bag through the cover. The inlet opening in the cover is formed by a raised portion in the cover which also defines a passage for guiding the grass clippings in the longitudinal direction of the bag ensuring that the bag fills evenly during a grass cutting operation.

DRAWINGS

Other objects and advantages of the present invention will become apparent from the following more detailed description taken in conjunction with the drawings, in which:

FIG. 1 is a side elevational view of a riding mower incorporating a grass-catcher assembly embodying the present invention;

FIG. 2 is an exploded perspective view of the grass-catcher assembly incorporated in the mower shown in FIG. 1;

FIG. 3 is an enlarged fragmental perspective view of a portion of the mower together with discharge chutes mounted thereon;

FIG. 4 is an enlarged fragmental, cross-sectional view taken generally along lines 4—4 of FIG. 1;

FIG. 5 is a perspective view of a main frame incorporated in the grass-catcher assembly;

FIG. 6 is an enlarged fragmental plan view illustrating attachment of a chute to the blade housing of the lawn mower;

FIG. 7 is an enlarged fragmental, cross-sectional view taken generally along lines 7—7 of FIG. 3; and FIG. 8 is an enlarged cross-sectional view taken generally along lines 8—8 of FIG. 1.

DETAILED DESCRIPTION

Referring to the drawings in detail, there is shown in FIG. 1 for illustration purposes only, a riding lawn mower generally designated 10, incorporating a grass-collector assembly generally designated 12, constituting a preferred embodiment of the present invention. Although the illustrated lawn mower is of the type marketed under the trademark SNAPPER COMET by the assignee of the subject application, the present invention may be incorporated in other lawn mowers or similar machines.

Mower 10 basically includes front and rear wheels 14 and 16 respectively, supported from a frame 18 having a gasoline-operated engine 22 and an operator's seat 20. Additionally, mower 10 includes a blade housing 24 situated in a horizontal plane and containing a rotatable cutting blade (not shown) in well-known manner. The right-hand side of blade housing 24 has a generally rectangular opening 25 for discharging grass clippings outwardly therefrom into a chute generally designated 26. The latter has a front portion with a generally rectangular opening therein for receiving a portion of blade housing 24 which defines discharge opening 25 so as to form, in effect, a continuous grass-discharge passage into chute 26. As shown in FIGS. 3, 6, and 7, the front portion of chute 26, when mounted on blade housing 24 lies in a horizontal plane parallel with blade housing 24, with the top wall 26a of chute 26 flatly engaged upon the top wall 24a of blade housing 24.

Securement of chute 26 to blade housing 24 is achieved through a generally U-shaped rigid clamp 28, one leg of which engages top wall 26a of chute 26 and the other leg engages top wall 24a of housing 24 as shown in FIG. 7. Clamp 28 is secured downwardly against chute 26 and blade housing 24 by means of a nut and bolt assembly generally designated 30 as shown in FIG. 7.

Chute 26 is further secured relative to housing 24 by means of a rigid bracket 32 affixed by fasteners 33 to the side wall of chute 26 as shown in FIG. 3. Bracket 32 terminates at one end in a vertical passage 34 which slidably receives a rod 36 having a handle portion 38 to facilitate manipulation into and out of passage 34. Once rod 36 is inserted in bracket passage 34, chute 26 is held against withdrawal from blade housing 24 by means of a support hook 40, the upper portion 41 of which is rigidly fixed to housing 24 while having a first lower portion 42 received in an elongated pocket 43 formed in the sidewall of chute 26, and a second portion 44 extending below the discharge opening at an angle to portion 42. Support hook 40 also serves to properly position chute 26 on the mower housing by virtue of receipt of its lower portion 42 in elongated pocket 43 formed in chute 26.

The rear portion 26b of chute 26 extends upwardly from the front portion of the chute at an angle of approximately 45° and in the shown embodiment, has a generally elliptical cross-section shown in FIG. 8. The flow path of grass clippings through upper portion 26b of chute 26 is generally at right angles to their flow path as they emerge from blade housing 24. In the preferred embodiment, chute 26 is made with an integral construction from a suitable light weight but durable plastic.

Grass clippings are conveyed from chute 26 into grass-collector 12 by an extension chute generally designated 50. The latter is made from clear plastic material originally in the form of a rectangular sheet which is rolled into an elliptical shape shown in FIG. 8 so as to be receivable over the open end of discharge chute 26. Once rolled into the elliptical shape shown in FIG. 8, the extension chute 50 is secured in its position by fasteners 52 received in apertures in overlapping edge portions of the sheet; the outer edge of the sheet being shown at 53 in the drawings. The transparency of extension conduit 50 provides visibility therein to determine the status of flow of the grass clippings therethrough. Extension chute 50 is mounted on discharge chute 26 by placing it over the end of the latter as shown in FIG. 3. The positioning of extension chute 50 on discharge chute 26 is provided by finger 54 affixed to the top wall portion of discharge chute 26 with a portion thereof in spaced relation from the surface of the latter to enable extension chute 50 to be received thereunder as shown in FIG. 3. Finger 54 also serves to maintain extension chute 50 in proper position on chute 26.

After emerging from extension chute 50, grass clippings are discharged into grass collector 12 at the rear of the mower. In the preferred embodiment, grass collector 12 includes a main frame 60 having a generally rectangular shape including opposite parallel sides 62 and ends 64; frame 60 being formed from any suitable material, such as tubular steel. Main frame 60 is mounted to the rear of mower frame 18 by a pair of tubular legs 65 rigidly fixed to the front side 62 of main frame to respectively receive a pair of vertical posts 68 fixed to the rear of mower frame 18. Main frame 60 is thereby positioned in a horizontal plan sufficiently above the ground surface for supporting a grass collecting bag as will be described below.

Opposite ends 64 of main frame 60 have fixed therein and depending therefrom rigid straps 66 made from suitable material such as steel rod, to form inwardly projecting shelves for slidably receiving and positioning a subsidiary frame 70, hereinafter referred to as "subframe." As shown in FIG. 4 straps 66 include vertical portions 66a fixed in main frame ends 64 and horizontal portions 66b projecting inwardly at right angles below the plane of main frame 60 for receiving subframe 70.

Subframe 70 is also rigid having a rectangular shape slightly less in overall dimension than main frame 60, and including opposite parallel sides and ends for supporting a flexible grass-collecting bag 80. The latter may have any suitable construction. However, the preferred embodiment includes a foraminous portion 87 provided by a suitable cloth or plastic weave or mesh and a nonapertured portion, preferably provided by a sheet of nylon or similar material. The upper portion of bag 80 is formed by two flaps 82 and 84 for receiving subframe 70 as shown in FIG. 4. To prevent removal of bag 80 from subframe 70 flaps 84 and 82 of bag 80 are attached to each other by means of a slide fastener or zipper generally designated 86. Subframe 70 with bag 80 suspended therefrom is mounted on main frame 60 by sliding the opposite end portions of subframe 70 in a horizontal plane along shelves 66 of main frame 60.

Subframe 70 with bag 80 thereon is maintained in proper position on main frame 60 by means of a releasable stop mechanism which in the shown embodiment includes a stop member 90 pivoted by a pin 94 to main frame 60 at 92. In order to release subframe 70 for sliding it out of main frame 60 for discharging the bag, stop 90 is merely pivoted upwardly about pivot 94. After subframe 70 is reinserted in main frame 60 for use, stop 90 is merely pivoted downwardly to overlie subframe 70 and prevent withdrawal from main frame 60.

The top of bag 80 is closed by a cover generally designated 100 having in the shown embodiment, a rectangular shape and being molded in one piece from a suitable self-supporting plastic material. In the shown embodiment, cover 100 is provided with vertical ribs 102 raised therefrom in the longitudinal direction thereof for reinforcement purposes. Cover 100 is located and attached in place to cover bag 80 by the upper portions of straps 66 which project upwardly from main frame 60 for receipt in apertures 104 provided in opposite ends of cover 100. Suitable fastener caps 106 are provided on the upper extremities of straps 66 to secure cover 100 in place. To facilitate positioning of cover 100 on main frame 60, the edge of cover 100 is formed with a curved downwardly projecting flange 108 conforming to the contour of the cross-sectional shape of main frame 60 as shown in FIG. 4.

Grass clippings emerging from extension conduit 50 are deposited in bag 80 through the upper open end thereof by means of an inlet conduit generally designated 110 integrally formed in cover 100.

The front portion of conduit 110 projects upwardly from the side edge of cover 110 and defines a generally U-shaped opening for receiving the upper end of extension conduit 50. Furthermore, as shown in FIG. 1, the portion 112 of cover 110 faces forwardly and downwardly at an angle to the vertical so as to facilitate receipt of extension conduit 50. It will be further seen from FIG. 2, that inlet conduit 110 curves from inlet opening at 112 in the longitudinal direction of the cover while decreasing in height and width until it terminates at 114 in the plane of cover 100. Grass clippings initially moving into conduit 110 will be conveyed and guided therein so as to be deposited in the longitudinal direction of the bag to ensure that the bag is filled evenly throughout as the cutting operation proceeds.

To install the grass catcher assembly, and assuming chutes 56 and 52 are properly in place as described above, and posts 68 are installed on the rear of the mower; main frame 60 is mounted to the mower by vertically sliding legs 65 on posts 68. Grass collector bag 80 is then placed on frame 70 and secured thereon by closing flaps 82 and 84 through means of zipper 86. Sub-frame 70 with bag 80 mounted thereon is then slid in a horizontal plane below main frame 60 along shelves 66 until in proper position aligned below main frame 60. In this latter operation, the forward movement of sub-frame 70 is limited by legs 66 of main frame 70 to thereby ensure proper positioning of sub-frame 70 relative to main frame 60. Stop mechanism 90 is then pivoted downwardly to overlie sub-frame 70 to thereby prevent withdrawal thereof. Cover 100 is then placed on the main frame by passing the extremeties of straps 66 through apertures 104 in the opposite ends of the cover while ensuring that the upper portion of extension conduit 50 is received in inlet opening 112 of conduit 110. The cover is then secured in place by installing caps 106 on the extremeties of straps 66.

When it is desired to empty the contents of bag 80 either during or subsequent to a cutting operation, stop mechanism 90 is pivoted upwardly to clear sub-frame 70 after which bag 80 together with sub-frame 70 may be slid outwardly in a horizontal plane from main frame 60. Bag 80 may then be emptied of its contents and then reinstalled on main frame 60 in the manner described above. It will be noted that during emptying of contents of bag 80, it is not necessary to move cover 100 of the assembly. Furthermore, the sub-frame 70 provides a convenient grip for manipulating the bag during the emptying thereof and reinstallation on main frame 60.

What is claimed is:

1. A grass catcher assembly comprising in combination a main frame adapted to be connected to a lawnmower or the like, a grass receiving receptacle, means on said frame for mounting said receptacle on said main frame for movement between a use position located adjacent said main frame and a discharge position spaced from said main frame to expose the receptacle for discharge of its contents, said receptacle having an open top portion, and a cover overlying and closing said receptacle opening, said cover having an inlet opening raised from the plane of the open top portion for receiving a chute adapted to be connected to an associated lawnmower for conveying grass clippings from the lawnmower to said receptacle through said cover, said cover having means forming a conduit portion raised from the open top portion and extending generally in the longitudinal direction of the receptacle and communicating with the interior of the receptacle, said conduit portion terminating at one end in said inlet opening for directing grass clippings to be deposited generally throughout the longitudinal direction of the receptacle.

2. The grass catcher assembly defined in claim 1 wherein said conduit gradually diminishes in height from said inlet opening to the opposite end of the conduit.

3. The grass catcher assembly defined in claim 2 wherein said conduit gradually diminishes in width from said inlet opening to the opposite end of the conduit.

4. The grass catcher assembly defined in claim 3 wherein the opposite end of the conduit lies generally in the plane of the cover.

5. The grass catcher assembly defined in claim 4 wherein said inlet opening faces to one side of the receptacle and the conduit curves from the inlet opening to the opposite end of the conduit.

6. The assembly defined in claim 1 wherein said receptacle includes a subframe defining an opening and a bag-like enclosure suspended from said subframe about the opening in said subframe.

7. The assembly defined in claim 6 wherein said bag-like enclosure has a zipper means about an upper edge portion thereof for releasably securing said bag-like enclosure to said subframe.

8. The assembly defined in claim 6 wherein said main frame and subframe are formed from rigid elongated members, and wherein said cover is made from self supporting material with the conduit portion integral with the cover.

9. The assembly defined in claim 8 wherein said main and subframes have a generally rectangular shape.

10. The assembly defined in claim 9 wherein said means mounting said receptacle on said main frame includes a pair of depending strap members on opposite ends of said main frame for receiving opposite end portions of said subframe.

11. The assembly defined in claim 10 further including stop means on said main frame for releasably retaining said subframe on said main frame.

12. The assembly defined in claim 11 wherein said main frame has a pair of tubular members depending downwardly therefrom at an angle to the plane of said main frame adapted to be received over posts on an associated lawn mower to locate and support said main frame in a generally horizontal plane.

13. The assembly defined in claim 11 wherein said stop means includes a stop member pivoted to the main frame for movement between an operative blocking position preventing sliding movement of said subframe relative to said main frame and a release position permitting said subframe to be slid out of said main frame.

14. The assembly defined in claim 13 including means releasably mounting said cover to said main frame.

15. The assembly defined in claim 14 wherein said cover is made from a self-supporting plastic material.

16. In combination with a lawnmower having a blade housing including a cutting blade for cutting grass in the blade housing, a discharge opening in the housing for discharging grass clippings cut in the housing, a chute attached to the housing in communication with the discharge opening and extending rearwardly of the mower for conducting grass clippings from the housing and rearwardly of the mower; a grass catcher assembly comprising a main frame mounted to the lawnmower at the rear thereof, a grass receiving receptacle mounted on said frame for slidable movement in a horizontal plane between a use position located in said main frame and a discharge position spaced from said main frame to expose the receptacle for discharge of its contents, and wherein said chute is in communication with said receptacle to convey grass clippings from the lawnmower housing to the receptacle, said receptacle including a cover on the top end thereof closing the receptacle, said cover having a conduit means raised above the plane of the bottom of the cover defining a conduit receiving said chute for directing grass clippings from one end to the other end of the receptacle.

17. The combination defined in claim 16 wherein said receptacle includes a subframe defining an opening and a bag like closure suspended from said subframe about the opening in said subframe, said cover closing said opening.

18. The combination defined in claim 17 wherein said conduit has an inlet receiving said chute and facing towards one side of said receptacle and wherein said conduit gradually diminishes in height and width from said inlet to the opposite end of the conduit.

19. The combination defined in claim 18 wherein said conduit curves from said inlet towards the opposite end of the conduit.

20. A grass catcher assembly comprising in combination; a receptacle for receiving grass clippings from a lawnmower, the receptacle being adapted to be mounted on a lawnmower, said receptacle including a bottom wall and side walls defining a chamber for receiving grass clippings, a cover on said receptacle closing said chamber, said cover having a conduit means raised above the top of said chamber communicating with the chamber for directing the deposit of grass clippings in the chamber, one end of said conduit means being located adjacent one end of the receptacle and defining an inlet opening for receiving a chute for conducting grass clippings therein, said conduit means extending longitudinally a substantial distance along the cover towards the other end of the cover and receptacle whereby grass clippings are deposited substantially along the entire end to end direction of the receptacle.

21. The grass catcher assembly defined in claim 20 wherein said inlet opening faces to one side of the receptacle and the conduit means curves from the inlet opening into the end to end direction of the receptacle.

22. The grass catcher assembly defined in claim 20 wherein said conduit means diminishes in height from the inlet opening to the opposite end of the conduit means.

23. The grass catcher assembly defined in claim 22 wherein said conduit means gradually diminishes in width from the inlet opening to the opposite end of the conduit means.

24. The grass catcher assembly defined in claim 22 wherein the conduit means terminates at its opposite end in the plane of the cover substantially.

25. The grass catcher assembly defined in claim 24 wherein said inlet opening is positioned at said one side of the receptacle.

26. The grass catcher assembly defined in claim 25 wherein said inlet opening faces to one side of the receptacle and also partly downwardly in the direction towards the plane of the bottom wall of the receptacle.

27. The grass catcher assembly defined in claim 21 wherein the inlet opening is positioned at said one side of the receptacle and faces partly to one side of said receptacle and partly downwardly in the direction of the plane of the bottom wall of the receptacle, and wherein said conduit means is integral with said cover.

* * * * *

REEXAMINATION CERTIFICATE (766th)
United States Patent [19]
Jackson

[11] B1 3,716,977
[45] Certificate Issued  Oct. 13, 1987

[54] GRASS CATCHER ASSEMBLY

[75] Inventor: Harold P. Jackson, McDonough, Ga.

[73] Assignee: McDonough Power Equipment, Inc., McDonough, Ga.

Reexamination Request:
No. 90/000,710, Jan. 11, 1985

Reexamination Certificate for:
| | |
|---|---|
| Patent No.: | 3,716,977 |
| Issued: | Feb. 20, 1973 |
| Appl. No.: | 196,583 |
| Filed: | Nov. 8, 1971 |

[51] Int. Cl.⁴ .............................................. A01D 34/70
[52] U.S. Cl. .......................................... 56/202; 15/83
[58] Field of Search ...................... 56/202, 16.6, 320.2

[56] References Cited
U.S. PATENT DOCUMENTS

| | | | |
|---|---|---|---|
| 1,180,225 | 4/1916 | Bamman et al. | 248/99 |
| 1,887,831 | 11/1932 | Willett et al. | 56/31 |
| 2,910,818 | 11/1959 | Beal et al. | 56/320.2 |
| 3,112,597 | 12/1963 | Heth et al. | 56/202 |
| 3,199,277 | 8/1965 | Moody | 56/166 |
| 3,400,523 | 9/1968 | Klingofstrom et al. | 56/320.2 |
| 3,522,695 | 8/1970 | Musgrave | 56/16.6 |
| 3,664,099 | 5/1972 | Chouinard | 56/202 |
| 3,668,846 | 6/1972 | Knight | 56/202 |
| 3,708,968 | 1/1973 | Enters et al. | 56/202 |
| 3,722,192 | 3/1973 | Corbett | 56/202 |

*Primary Examiner*—Paul J. Hirsch

[57] ABSTRACT

A grass catcher assembly for a lawn mower including a rectangular main frame adapted to be supported at the rear of a lawn mower in a horizontal plane, a rectangular subframe having a bag suspended therefrom with the subframe slidably mounted for movement in a horizontal plane relative to said main frame. Closing the top of the bag is a cover releasably secured on the main frame and having an inlet opening for receiving a chute extending from the blade housing of the mower to deliver grass clippings into the bag through the cover. The inlet opening is located on one side of the cover and defined by a raised portion on the cover which also defines a passage for guiding the grass clippings in the longitudinal direction of the bag to ensure uniform distribution of the grass clippings across the bag. The subframe with the bag depending therefrom is releasably retained in the main frame for use by means of a pivoted stop which may be moved to release the subframe and permit it together with the bag to be slid in a horizontal plane out of the main frame for discharging the contents of the bag.

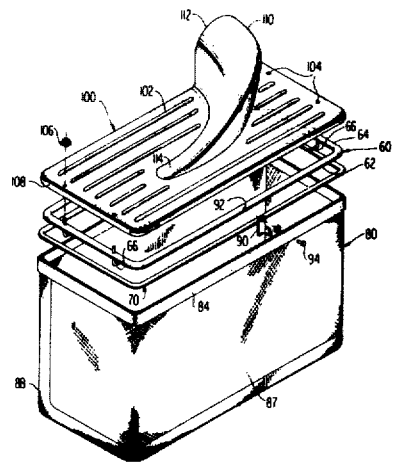

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 is confirmed.

Claim 21 is cancelled.

Claims 16, 20 and 27 are determined to be patentable as amended.

Claims 17–19 and 22–26, dependent on an amended claim, are determined to be patentable.

New claims 28–58 are added and determined to be patentable.

16. In combination with a lawnmower having a blade housing including a cutting blade for cutting grass in the blade housing, a discharge opening in the housing for discharging grass clippings cut in the housing, a chute attached to the housing in communication with the discharge opening and extending *along a first direction* rearwardly of the mower for conducting grass clippings from the housing and rearwardly of the mower; a grass catcher assembly comprising a main frame mounted to the lawnmower at the rear thereof, a grass receiving receptacle mounted on said frame for slidable movement in a horizontal plane between a use position located in said main frame and a discharge position spaced from said main frame to expose the receptacle for discharge of its contents, and wherein said chute is in communication with said receptacle to convey grass clippings from the lawnmower housing to the receptacle, said receptacle including a cover on the top end thereof closing the receptacle, said cover having a conduit means raised above the plane of the bottom of the cover defining a conduit receiving said chute for directing grass clippings from one end to the other end of the receptacle *in a second direction transverse to said first direction, said conduit means being imperforate to prevent escape of the grass clippings therefrom.*

20. A grass catcher assembly comprising in combination; a receptacle for receiving grass clippings from a lawnmower, the receptacle being adapted to be mounted on a lawnmower, said receptacle including a bottom wall and side walls defining a chamber for receiving grass clippings, a cover on said receptacle closing said chamber, said cover having a conduit means raised above the top of said chamber communicating with the chamber for directing the deposit of grass clippings in the chamber, one end of said conduit means being located adjacent one end of the receptacle and defining an inlet opening for receiving a chute for conducting grass clippings therein, said conduit means extending longitudinally a substantial distance along the cover towards the other end of the cover and receptacle whereby grass clippings are deposited substantially along the entire end to end direction of the receptacle and wherein said inlet opening faces to one side of the receptacle and the conduit means curves from the inlet opening into the end to end direction of the receptacle.

27. The grass catcher assembly defined in claim [21] *20* wherein the inlet opening is positioned at said one side of the receptacle and faces partly to one side of said receptacle and partly downwardly in the direction of the plane of the bottom wall of the receptacle, and wherein said conduit means is integral with said cover.

*28. In combination with a lawn mower having a direction of travel and having a blade housing including a cutting blade rotatable in a generally horizontal plane for cutting grass in the blade housing, a discharge opening in the housing located towards one side of the housing for discharging grass clippings cut in the housing, a chute attached to the housing in communication with the discharge opening and extending rearwardly of the mower for conducting grass clippings from the housing and rearwardly of the mower; a grass catcher assembly comprising in combination, a receptacle for receiving grass clippings from the lawn mower, the receptacle being mounted on the lawn mower at the rear end of the mower, said receptacle having opposite ends and including a bottom wall and opposite side walls defining a chamber for receiving grass clippings, a cover on said receptacle closing said chamber, said cover having a conduit means raised above the top of said chamber communicating with the chamber for directing the deposit of grass clippings in the chamber, one end of said conduit means being located adjacent one end of the receptacle and defining an inlet opening receiving the chute for conducting grass clippings therein, said conduit means extending longitudinally a substantial distance along the cover towards the other end of the cover and receptacle whereby grass clippings are conveyed above the top of the chamber and deposited into the chamber through the top of the chamber substantially along the entire end-to-end direction of the receptacle between the opposite side walls thereof, and wherein said chute and conduit means define a flow path for grass clippings which flow path includes means for changing the direction of flow of the grass clippings to flow from along said direction of travel to said end-to-end direction of the receptacle between the opposite side walls thereof, and wherein said conduit means is imperforate to prevent escape of the grass clippings therefrom.*

*29. The lawn mower defined in claim 28 wherein said means for changing the direction of flow of the grass clippings is located within said conduit means.*

*30. The lawn mower defined in claim 28 wherein said means for changing the direction of the grass clippings is such that the grass clippings change direction gradually along a generally curved path.*

*31. The lawn mower defined in claim 28 wherein said inlet opening extends above a plane formed by the top of said chamber.*

*32. The lawn mower defined in claim 28 wherein said end-to-end direction of the receptacle extends across the rear of the mower transversely of said direction of travel.*

*33. The lawn mower defined in claim 28 wherein one of said cover and receptacle is movable relative to the other to provide access into the receptacle for emptying grass clippings therefrom.*

*34. The lawn mower defined in claim 33 wherein said means for changing the direction of flow of the grass clippings is located within said conduit means, and wherein* said inlet opening extends above a plane formed by the top of said chamber.

35. The lawn mower defined in claim 34 including means mounting the receptacle for movement between a use position located under said cover and a discharge position removed from under the cover for discharging the contents of the receptacle.

36. The lawn mower defined in claim 35 wherein said inlet opening faces partly downwardly in alignment with said chute.

37. The lawn mower defined in claim 34 wherein said receptacle includes a receptacle frame rigidly mounted to the lawn mower to be movable with the same; and a bag suspended from the receptacle frame.

38. In combination with a riding lawn mower having a direction of travel and having a frame, a blade housing supported by the frame and including a cutting blade rotatable in a generally horizontal plane for cutting grass in the blade housing, a discharge opening in the housing located towards one side of the housing for discharging grass clippings cut in the housing, a chute attached to the housing in communication with the discharge opening and extending generally in the direction of travel at an angle to the horizontal rearwardly of the mower for conducting grass clippings from the housing and rearwardly of the mower; a grass catcher assembly comprising in combination, a receptacle for receiving grass clippings from the lawn mower, the receptacle being mounted with respect to the frame and extending across the rear of the lawn mower while being spaced above the ground surface, said receptacle having opposite ends and including a bottom spaced from the ground surface and side walls defining a chamber for receiving grass clippings, a cover on said receptacle closing said chamber, said cover having a conduit means raised above the top of said chamber communicating with the chamber for directing the deposit of grass clippings in the chamber, one end of said conduit means being located adjacent one end of the receptacle and defining an inlet opening receiving the chute for conducting grass clippings therein, said conduit means extending longitudinally a substantial distance along the cover towards the other end of the cover and receptacle whereby grass clippings are conveyed above the top of the chamber and deposited into the chamber through the top of the chamber substantially along the entire end-to-end direction of the receptacle which end-to-end direction extends across the rear of the lawn mower transversely of said direction of travel.

39. The lawn mower defined in claim 38 wherein said chute and conduit means define a flow path for grass clippings and wherein there is included within said flow path means for changing the direction of flow of the grass clippings to flow into the end-to-end direction of the receptacle.

40. The lawn mower defined in claim 39 wherein said means for changing the direction of flow of grass clippings is located in said conduit means.

41. The lawn mower defined in claim 40 wherein said conduit means includes a portion which curves gradually into said end-to-end direction of the receptacle.

42. The lawn mower defined in claim 39 wherein said inlet opening extends above a plane formed by the top of said chamber.

43. The lawn mower defined in claim 42 wherein said inlet opening faces partly downwardly in alignment with said chute.

44. The lawn mower defined in claim 39 wherein one of said cover and receptacle is movable relative to the other to provide access into the receptacle for emptying grass clippings therefrom.

45. The lawn mower defined in claim 44 including means mounting the receptacle for movement between a use position located under said cover and a discharge position removed from under the cover for discharging the contents of the receptacle.

46. The lawn mower defined in claim 44 wherein said receptacle includes a frame removably mounted to the lawn mower, and a bag suspended from the receptacle frame and being removable therefrom, and wherein said cover is mounted to said frame.

47. A grass catcher assembly comprising in combination, a receptacle for receiving grass clippings from a lawn mower, the receptacle being adapted to be mounted on a lawn mower, said receptacle including a bottom wall and side walls defining a chamber for receiving grass clippings, a cover on said receptacle closing said chamber, said cover having a conduit means raised above the top of said chamber communicating with the chamber for directing the deposit of grass clippings in the chamber, one end of said conduit means being located adjacent one end of the receptacle and defining an inlet opening for receiving a chute for conducting grass clippings therein, a chute received in the inlet opening for conducting grass clippings therein, said chute having a portion extending in a first direction, said conduit means extending longitudinally along a second direction transverse to said first direction and for a substantial distance along the cover towards the other end of the cover and receptacle whereby grass clippings are conveyed and deposited substantially along the entire end-to-end direction of the receptacle, and wherein said chute and conduit means define a flow path for grass clippings which flow path includes means for changing the direction of flow of the grass clippings to flow from said first direction to said second direction and in said end-to-end direction of the receptacle.

48. The grass catcher defined in claim 47 wherein said cover includes a bottom portion located adjacent the top of the receptacle, and said conduit means is defined by portions of the cover raised from a plane formed by the bottom portion of the cover.

49. The grass catcher assembly defined in claim 47 wherein said conduit means changes direction from the inlet opening into the end-to-end direction of the receptacle.

50. The grass catcher assembly defined in claim 47 wherein said inlet opening extends above a plane formed by the bottom portion of the cover.

51. A grass catcher assembly comprising in combination a main frame adapted to be connected to a lawn mower or the like, a grass receiving receptacle, means on said frame for mounting said receptacle on the main frame for movement between a use position located adjacent said main frame and a discharge position spaced from said main frame to expose the receptacle for discharge of its contents, said receptacle having an open top portion, and a cover overlying and closing said receptacle opening, said cover having an inlet opening raised from the plane of the open top portion for receiving a chute adapted to be connected to an associated lawn mower for conveying grass clippings along a first direction from the lawn mower to said receptacle through said cover, said cover having means forming a conduit portion extending in a second direction transverse to said first direction and raised from the open top portion and extending generally in the longitudinal direction of the receptacle and communicating with the interior of the receptacle, said conduit portion terminating at one end in said inlet opening for directing grass clippings to be deposited generally throughout the longitudinal direction of the receptacle, and said conduit portion including means for changing the direction of flow of grass clippings from said first direction to said second direction to cause the grass clippings to flow into the longitudinal direction of the receptacle and wherein said conduit portion is imperforate to prevent escape of the grass clippings therefrom.

52. The grass catcher assembly defined in claim 51 wherein said means for changing the direction of flow of grass clippings gradually curves into the longitudinal direction of the receptacle.

53. The grass catcher assembly defined in claim 51 wherein said receptacle includes a bag suspended from the frame.

54. The grass catcher assembly defined in claim 53 wherein said bag includes a foraminous portion.

55. The grass catcher assembly defined in claim 54 wherein said cover is made from a self-supporting molded material.

56. The grass catcher assembly defined in claim 53 wherein said frame includes means for removably mounting the frame to a lawn mower.

57. The grass catcher assembly defined in claim 56 wherein said main frame includes a subframe from which said bag is suspended, said subframe being removably mounted to said main frame, and wherein said cover is mounted to said main frame.

58. The grass catcher assembly defined in claim 57 wherein said cover is fixed to said main frame.

* * * * *